United States Patent [19]

Eisen et al.

[11] Patent Number: 5,809,323
[45] Date of Patent: Sep. 15, 1998

[54] METHOD AND APPARATUS FOR EXECUTING FIXED-POINT INSTRUCTIONS WITHIN IDLE EXECUTION UNITS OF A SUPERSCALAR PROCESSOR

[75] Inventors: Lee E. Eisen, Austin; Robert T. Golla, Plano; Soummya Mallick, Austin; Sung-Ho Park, Austin; Rajesh B. Patel, Austin; Michael Putrino, Austin, all of Tex.

[73] Assignee: International Business Machines Corporation, Armonk, N.Y.

[21] Appl. No.: 530,552

[22] Filed: Sep. 19, 1995

[51] Int. Cl.[6] ........................................... G06F 9/38
[52] U.S. Cl. ............................................... 395/800.23
[58] Field of Search ........................... 395/675, 800.23; 364/281, 975.5

[56] References Cited

U.S. PATENT DOCUMENTS

| | | | |
|---|---|---|---|
| 4,110,831 | 8/1978 | Langdon, Jr. | 364/745.04 |
| 4,620,292 | 10/1986 | Hagiwara et al. | 364/748.07 |
| 4,631,696 | 12/1986 | Sakamoto | 364/715.03 |
| 4,796,218 | 1/1989 | Tanaka et al. | |
| 4,977,534 | 12/1990 | Takahashi | 364/748.14 |
| 4,999,803 | 3/1991 | Turrini et al. | 364/748.11 |
| 5,185,713 | 2/1993 | Kobunaya | 364/748.07 |
| 5,222,037 | 6/1993 | Taniguchi | 364/748.03 |
| 5,301,137 | 4/1994 | Matsuo et al. | 364/748.07 |
| 5,615,350 | 3/1997 | Hesson et al. | 395/394 |

OTHER PUBLICATIONS

Groves et al.; An IBM Second Generation RISC Processor Architecture; COMPCON Spring '90 IEEE Computer Society Int'l Conference; 1990; pp. 166–172.

Barreh et al.; The POWER2 Processor; COMPCON Spring '90 IEEE Computer ... 1990; pp. 389–398.

Moore et al.; IBM Single Chip RISC Processor (RSC) Computer Design—ICCD '92, 1992 International Conference; 1992; pp. 200–204.

Alpert et al., "Superscalar Processor Architecture ... ", IBM Technical Disclosure Bulletin, vol. 37, No. 02B, Feb. 1994, pp. 699–702.

*Primary Examiner*—Parshotam S. Lall
*Assistant Examiner*—Kenneth R. Coulter
*Attorney, Agent, or Firm*—Brian F. Russell; Andrew J. Dillon

[57] ABSTRACT

A superscalar processor and method for executing fixed-point instructions within a superscalar processor are disclosed. The superscalar processor has a memory and multiple execution units, including a fixed point execution unit (FXU) and a non-fixed point execution unit (non-FXU). According to the present invention, a set of instructions to be executed are fetched from among a number of instructions stored within memory. A determination is then made if n instructions, the maximum number possible, can be dispatched to the multiple execution units during a first processor cycle if fixed point arithmetic and logical instructions are dispatched only to the FXU. If so, n instructions are dispatched to the multiple execution units for execution. In response to a determination that n instructions cannot be dispatched during the first processor cycle, a determination is made whether a fixed point instruction is available to be dispatched and whether dispatching the fixed point instruction to the non-FXU for execution will result in greater efficiency. In response to a determination that a fixed point instruction is not available to be dispatched or that dispatching the fixed point instruction to the non-FXU will not result in greater efficiency, dispatch of the fixed point instruction is delayed until a second processor cycle. However, in response to a determination that dispatching the fixed point instruction to the non-FXU will result in greater efficiency, the fixed point instruction is dispatched to the non-FXU and executed, thereby improving execution unit utilization.

13 Claims, 5 Drawing Sheets

METHOD AND APPARATUS FOR EXECUTING FIXED-POINT INSTRUCTIONS WITHIN IDLE EXECUTION UNITS OF A SUPERSCALAR PROCESSOR

BACKGROUND OF THE INVENTION

1. Technical Field

The present invention relates in general to a method and apparatus for data processing and in particular to a method and apparatus for executing fixed-point instructions within a superscalar processor. Still more particularly, the present invention relates to a method and apparatus for executing fixed-point instructions within a superscalar processor which enhance processor throughput by dispatching fixed-point instructions which would otherwise stall the dispatch pipeline to idle non-fixed point execution units.

2. Description of the Related Art

Processor performance within superscalar processors is limited by many factors, including the dispatch bandwidth of the processor, the availability of execution unit resources, and the completion bandwidth of the processor. A typical superscalar processor, which includes fixed-point, floating-point, and load/store execution units, for example, is capable of executing one instruction of each instruction class during each processor cycle. However, because only a limited number of instructions within each instruction class may be dispatched to any one execution unit during a processor cycle, processor performance is degraded when fewer than the maximum number of instructions are dispatched due to the unavailability of execution unit resources. The inability of the processor to dispatch instructions capable of being dispatched due to the unavailability of execution unit resources is known as a dispatch stall.

One possible processor enhancement which minimizes dispatch stalls is the provision of multiple execution units that execute the same class of instructions. For example, a processor could be equipped with multiple fixed-point or floating-point execution units. Processor performance analysis indicates that in cases in which only a single execution unit is duplicated, processor performance is maximized by the provision of an additional fixed-point execution unit. However, due to the increase in processor die size and power requirements required to implement additional execution units, it is often impractical or uneconomical for a processor designer to duplicate execution units.

Consequently, it would be desirable to provide an improved method and apparatus for executing instructions within a superscalar processor which enhance processor performance by dispatching fixed-point instructions which would otherwise cause dispatch stalls to idle non-fixed point execution units.

SUMMARY OF THE INVENTION

It is therefore one object of the present invention to provide an improved method and apparatus for data processing.

It is another object of the present invention to provide an improved method and apparatus for executing fixed-point instructions within a superscalar processor.

It is yet another object of the present invention to provide an improved method and apparatus for executing fixed-point instructions within a superscalar processor which enhance processor throughput by dispatching fixed-point instruction which would otherwise stall the dispatch pipeline to idle non-fixed point execution units.

The foregoing objects are achieved as is now described. A superscalar processor and method for executing fixed-point instructions within a superscalar processor are disclosed. The superscalar processor has a memory and multiple execution units, including a fixed point execution unit (FXU) and a non-fixed point execution unit (non-FXU). According to the present invention, a set of instructions to be executed are fetched from among a number of instructions stored within memory. A determination is then made if n instructions, the maximum number possible, can be dispatched to the multiple execution units during a first processor cycle if fixed point arithmetic and logical instructions are dispatched only to the FXU. If so, n instructions are dispatched to the multiple execution units for execution. In response to a determination that n instructions cannot be dispatched during the first processor cycle, a determination is made whether a fixed point instruction is available to be dispatched and whether dispatching the fixed point instruction to the non-FXU for execution will result in greater efficiency. In response to a determination that a fixed point greater efficiency, dispatch of the fixed point instruction is delayed until the processor cycle following the next processor cycle. However, in response to a determination that dispatching the fixed point instruction to the non-FXU will result in greater efficiency, the fixed point instruction is dispatched to the non-FXU and executed, thereby maximizing execution unit utilization.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
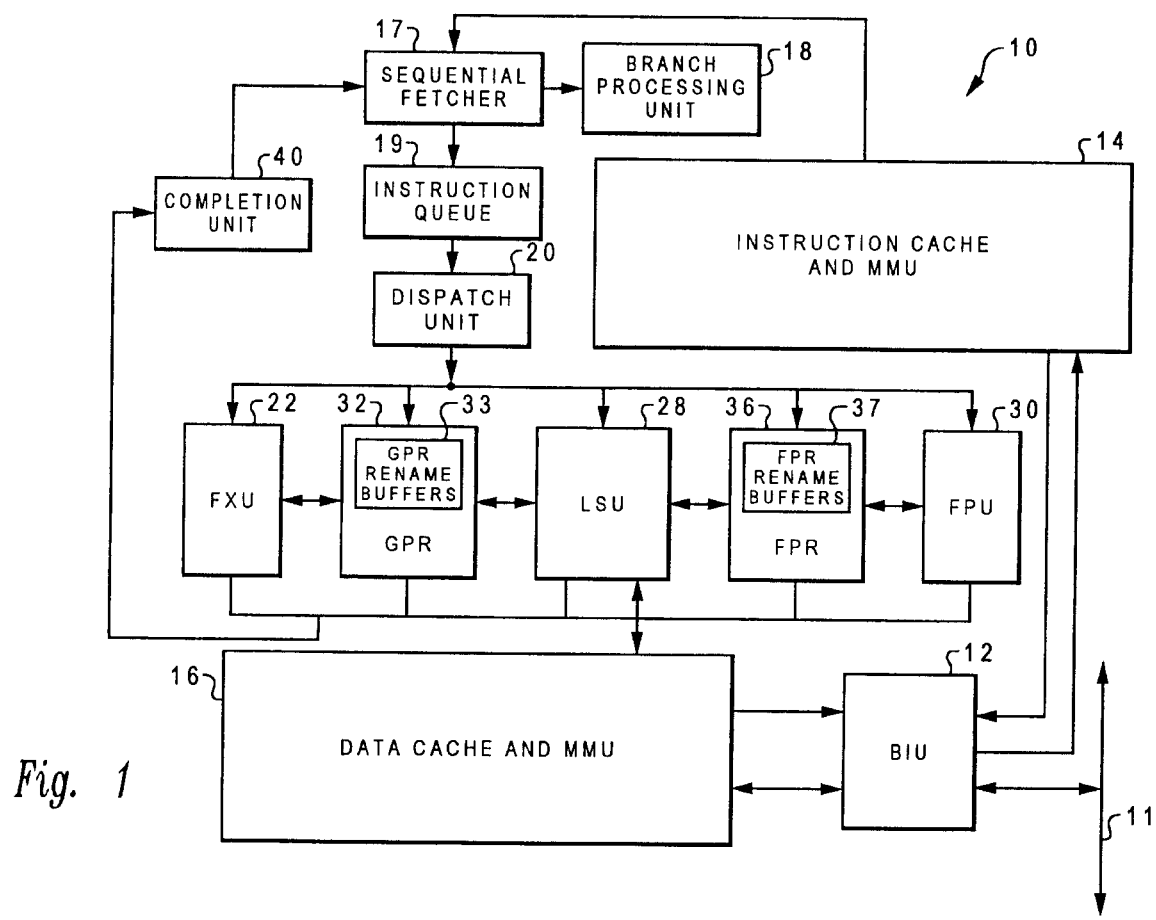
FIG. 1 illustrates a block diagram of a preferred embodiment of a superscalar processor which employs the present invention.

With reference now to the figures and in particular with reference to FIG. 1, there is illustrated a block diagram of a processor, indicated generally at 10, for processing information according to a preferred embodiment of the present invention. In the depicted embodiment, processor 10 comprises a single integrated circuit superscalar microprocessor. Accordingly, as discussed further below, processor 10 includes various execution units, registers, buffers, memories, and other functional units, which are all formed by integrated circuitry. In a preferred embodiment of the present invention, processor 10 comprises one of the PowerPC™ line of microprocessors, which operates according to reduced instruction set computing (RISC) techniques. As depicted in FIG. 1, processor 10 is coupled to system bus 11 via a bus interface unit (BIU) 12 within processor 10. BIU 12 controls the transfer of information between processor 10 and other devices coupled to system bus 11, such as a main memory (not illustrated). Processor 10, system bus 11, and the other devices coupled to system bus 11 together form a host data processing system.

BIU 12 is connected to instruction cache 14 and data cache 16 within processor 10. High speed caches, such as instruction cache 14 and data cache 16, enable processor 10 to achieve relatively fast access time to a subset of data or instructions previously transferred from main memory to caches 14 and 16, thus improving the speed of operation of the host data processing system. Instruction cache 14 is further coupled to sequential fetcher 17, which fetches instructions from instruction cache 14 during each cycle for execution. Sequential fetcher 17 transmits branch instructions fetched from instruction cache 14 to branch processing unit (BPU) 18 for execution, but temporarily stores sequential instructions within instruction queue 19 for execution by other execution circuitry within processor 10.

In the depicted embodiment, in addition to BPU 18, the execution circuitry of processor 10 comprises multiple execution units, including fixed-point unit (FXU) 22, load/store unit (LSU) 28, and floating-point unit (FPU) 30. As is well-known to those skilled in the computer arts, each of execution units 22, 28, and 30 typically executes one or more instructions within a particular class of sequential instructions during each processor cycle. For example, FXU 22 performs fixed-point mathematical and logical operations such as addition, subtraction, ANDing, ORing, and XORing, utilizing source operands received from specified general purpose registers (GPRs) 32 or GPR rename buffers 33. Following the execution of a fixed-point instruction, FXU 22 outputs the data results of the instruction to GPR rename buffers 33, which provide temporary storage for the result data until the instruction is completed by transferring the result data from GPR rename buffers 33 to one or more of GPRs 32. Conversely, FPU 30 typically performs floating-point arithmetic and logical operations, such as floating-point multiplication and division, on source operands received from floating-point registers (FPRs) 36 or FPR rename buffers 37. FPU 30 outputs data resulting from the execution of floating-point instructions to selected FPR rename buffers 37, which temporarily store the result data until the instructions are completed by transferring the result data from FPR rename buffers 37 to selected FPRs 36. As its name implies, LSU 28 typically executes floating-point and fixed-point instructions which either load data from memory (i.e., either data cache 16 or main memory) into selected GPRs 32 or FPRs 36 or which store data from a selected one of GPRs 32, GPR rename buffers 331 FPRs 36, or FPR rename buffers 37 to memory. However, as described below in greater detail, according to the present invention fixed-point arithmetic and logical instructions are also selectively executed by LSU 28 and FPU 30 during idle cycles in order to maximize the utilization of LSU 28 and FPU 30 and to minimize dispatch stalls.

Processor 10 employs both pipelining and out-of-order execution of instructions to further improve the performance of its superscalar architecture. Accordingly, instructions can be executed by FXU 22, LSU 28, and FPU 30 in any order as long as data dependencies are observed. In addition, instructions are processed by each of FXU 22, LSU 28, and FPU 30 at a sequence of pipeline stages. As is typical of high-performance processors, each instruction is processed at five distinct pipeline stages, namely, fetch, decode/dispatch, execute, finish, and completion.

During the fetch stage, sequential fetcher 17 retrieves one or more instructions associated with one or more memory addresses from instruction cache 14. Sequential instructions fetched from instruction cache 14 are stored by sequential fetcher 17 within instruction queue 19. In contrast, sequential fetcher 17 removes (folds out) branch instructions from the instruction stream and forwards them to BPU 18 for execution. BPU 18 includes a branch prediction mechanism, which in a preferred embodiment comprises a dynamic prediction mechanism such as a branch history table, that enables BPU 18 to speculatively execute unresolved conditional branch instructions by predicting whether the branch will be taken.

During the decode/dispatch stage, dispatch unit 20 decodes and dispatches one or more instructions from instruction queue 19 to execution units 22, 28, and 30 in program order. Also during the decode/dispatch stage, dispatch unit 20 allocates a rename buffer within GPR rename buffers 33 or FPR rename buffers 37 for each dispatched instruction's result data. According to a preferred embodiment of the present invention, processor 10 tracks the program order of the dispatched instructions during out-of-order execution utilizing unique instruction identifiers.

During the execute stage, execution units 22, 28, and 30 execute instructions received from dispatch unit 20 opportunistically as operands and execution resources for the indicated operations are available. In a preferred embodiment of the present invention, each of execution units 22, 28, and 30 are equipped with a reservation station that stores instructions dispatched to that execution unit until operands or execution resources become available. After execution of an instruction has terminated, execution units 22, 28, and 30 store result data within either GPR rename buffers 33 or FPR rename buffers 37, depending upon the instruction type. Then, execution units 22, 28, and 30 notify completion unit 40 which instructions have finished execution. Finally, instructions are completed by completion unit 40 in program order by transferring result data from GPR rename buffers 33 and FPR rename buffers 37 to GPRs 32 and FPRs 36, respectively.

It is well-known in the art that multiple instances of the same type of execution unit provides enhanced processor performance. In particular, processor performance analysis indicates that the greatest performance enhancement is achieved by implementing multiple FXUs. However, because duplicating a FXU substantially increases the size and power consumption of a processor, it is often unfeasible to implement multiple execution units of the same type within a processor targeted for a low-power or low-cost market. Therefore, as described below, processor 10 utilizes LSU 28 and FPU 30 to execute fixed-point instructions, thereby realizing the performance enhancement afforded by multiple FXUs without substantially increasing the power consumption or size of processor 10.

Figure 2:
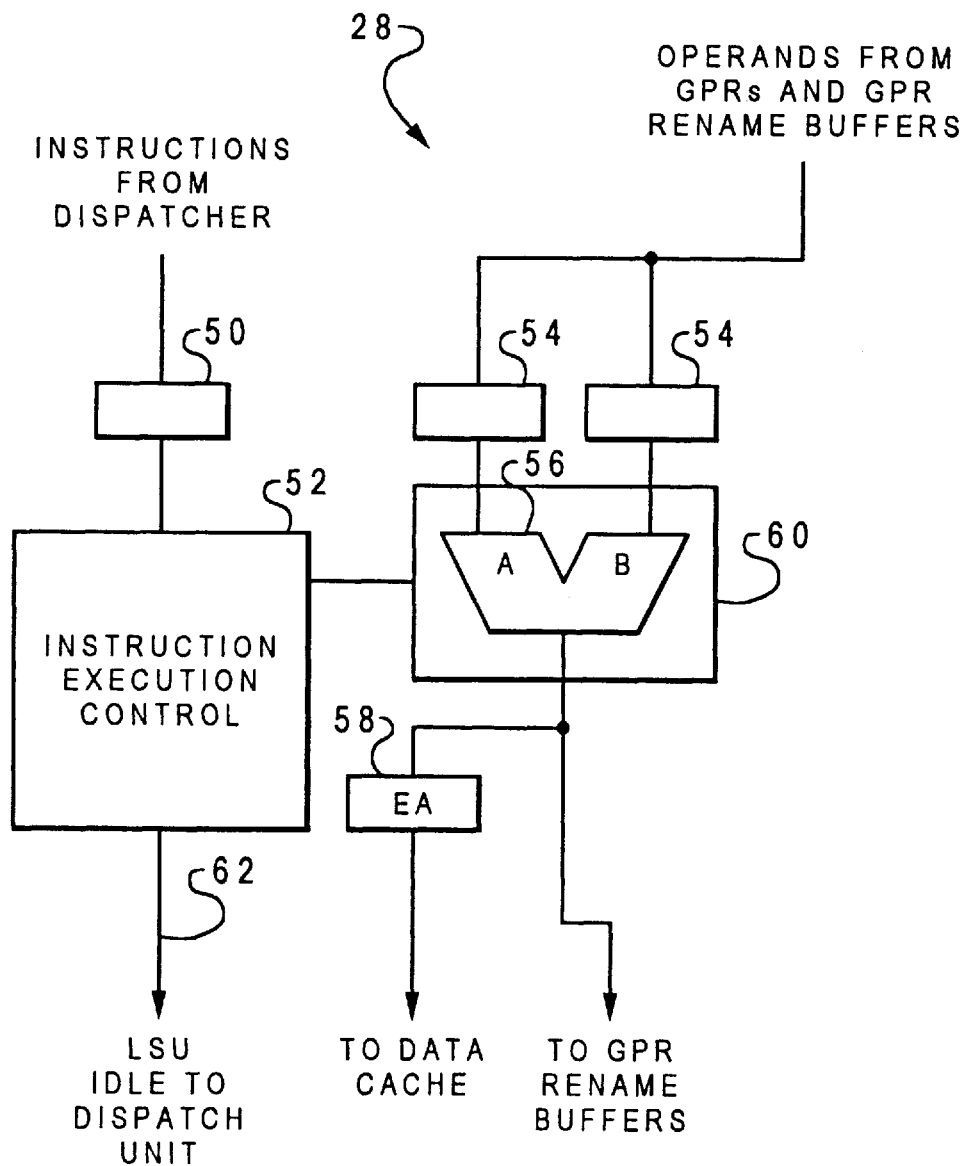
FIG. 2 depicts a more detailed block diagram of the load/store execution unit of the superscalar processor illustrated in FIG. 1.

Referring now to FIG. 2, there is depicted a more detailed block diagram of LSU 28. As described above, LSU 28 typically executes fixed-point and floating-point load and store instructions. Instructions dispatched to LSU 28 by dispatch unit 20 are initially stored within instruction execution buffer 50 before being decoded by instruction execution control 52, which controls the operation of arithmetic logic unit (ALU) 60. When load and store instructions are executed by LSU 28, adder 56 within ALU 60 calculates the effective address for each instruction by adding A and B fixed-point operands stored within operand buffers 54. The resulting effective address contained within effective address buffer 58 is utilized to access the target memory address within data cache 16.

According to a first aspect of the present invention, in addition to adder 56, ALU 60 includes logic to perform fixed-point arithmetic and logical operations. As will be appreciated by those skilled in the art, the processor die area required to implement logic to perform fixed-point logical operations and comparisons is extremely minimal compared with the chip area required to implement another FXU. Thus, by providing minimal additional logic within a conventional LSU and a connection between the output of ALU 60 and the GPR rename buffer bus, an additional resource for executing fixed-point instructions can be realized without having to implement an additional adder, execution instruction buffer, or rename drivers.

According to a preferred embodiment of the present invention, dispatch unit 20 dispatches fixed-point arithmetic and logical instructions to LSU 28 only when LSU 28 is idle and the operands required by the fixed-point instructions are available. LSU 28 signals dispatch unit 20 that it is idle, that is, that LSU 28 is not performing an effective address calculation for a load or store instruction, by asserting LSU idle signal 62. When executing a typical program, dispatching fixed-point arithmetic and logical instructions to LSU 28 results in enhanced execution efficiency only when LSU 28 is idle since a large majority of the instructions within a typical program are load or store instructions that have longer latencies and take longer to execute than fixed-point arithmetic and logical instructions. To determine whether the operands of a particular fixed-point arithmetic or logical instruction are available, dispatch unit 20 verifies that none of the operands are the result of an unfinished instruction. Thus, dispatch unit 20 determines that all of the operands of the instruction are stored within GPRs 32 or GPR rename buffers 33 to ensure that the operands can be retrieved and the instruction executed within a single processor cycle, thereby preventing a dispatch stall on a load or store instruction during the following processor cycle. By implementing the LSU of the present invention, the instruction throughput of a typical superscalar processor such as that illustrated in FIG. 1 may be increased as much as 6% while saving 5 mm² of chip area as compared to processors which utilize a second FXU.

According to a second aspect of the present invention, fixed-point arithmetic and logical instructions can also be executed by FPU 30. Since typical personal computer applications include few floating-point calculations, the FPU within a conventional superscalar processor is frequently idle. Thus, by utilizing FPU 30 to perform fixed-point operations, the instruction throughput of processor 10 is greatly enhanced and the utilization of FPU 30 is maximized.

Figure 3:
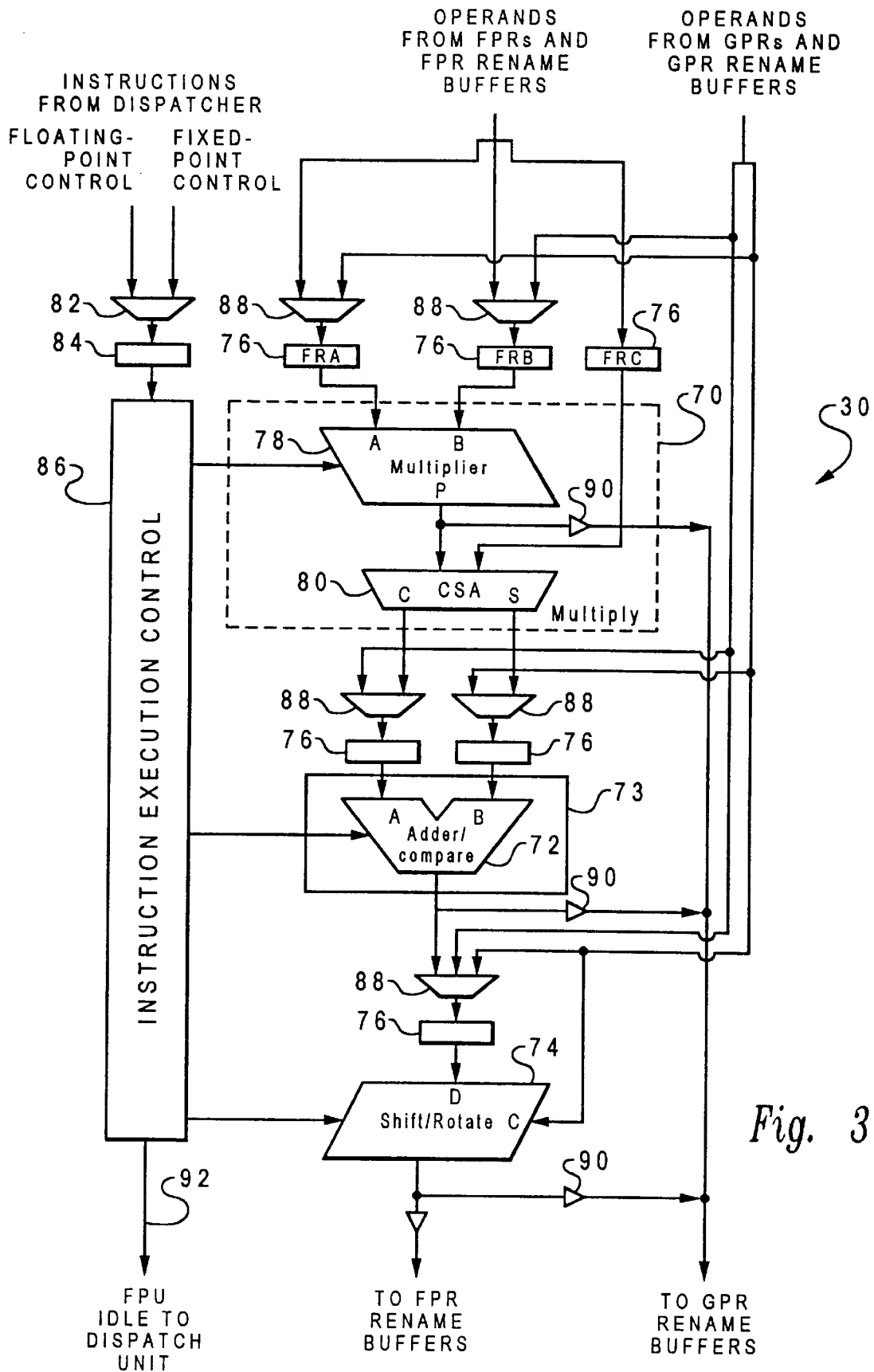
FIG. 3 illustrates a more detailed block diagram of the floating-point execution unit of the superscalar processor depicted in FIG. 1.

With reference now to FIG. 3, there is illustrated a more detailed block diagram of FPU 30. As is typical of conventional FPUs, FPU 30 includes a multiplication unit 70, an adder 72, and a shifter 74. At the beginning of a floating-point calculation, which is typically of the form A×B+C, the A, B, and C floating-point operands are received from FPRs 36 and FPR rename buffers 37 and are stored within operand buffers 76. The A and B operands are then multiplied within multiplier 78 and added to the C operand within carry save adder (CSA) 80, which generates an intermediate sum and a carry. The intermediate sum and carry are then stored within operand buffers 76 associated with carry propagate adder (CPA) 73. Next, adder 72 within CPA 73 adds the intermediate sum and carry generated within multiplication unit 70 to produce the sum A×B+C. The sum is then stored within the operand buffer 76 associated with shifter 74. Thereafter, the sum is normalized by shifter 74 and stored within one of FPR rename buffers 37. For the depicted implementation, a floating-point instruction typically requires three cycles to complete, but since floating-point instructions are pipelined, FPU 30 typically completes one floating-point instruction per cycle.

According to the present invention, FPU 30 includes enhancements over conventional FPUs which enable FPU 30 to perform fixed-point operations. For example, in addition to adder 72, CPA 73 includes logic for performing fixed-point logical and compare operations. Similarly, shifter 74 includes logic for performing shifts and rotates of fixed-point values. FPU 30 further includes an idle signal 92, which indicates to dispatch unit 20 whether FPU 30 is idle. As with LSU 28, instructions are preferably dispatched to FPU 30 only when FPU 30 is idle to prevent the execution of fixed-point instructions within FPU 30 from delaying the execution of floating-point instructions.

When an instruction is dispatched to FPU 30 from dispatch unit 20, the instruction passes through mux 82 and is latched into instruction execution buffer 84. Instruction execution control 86 decodes the instruction, and based on whether the instruction is a fixed-point instruction or a floating-point instruction, selects the appropriate inputs to muxes 88. As depicted, the operands of a fixed-point instruction are latched directly into the operand buffers 76 of the appropriate one of multiplication unit 70, CPA 73, and shifter 74 to enable the fixed-point instruction to be executed within a single processor cycle. The fixed-point result data generated by the instruction is then driven to GPR rename buffers 33 by one of drivers 90. For example, if a fixed-point addition instruction is dispatched to FPU 30, the fixed-point A and B operands are selected by muxes 88 and latched into operand buffers 76 associated with CPA 73. The operands are then added by adder 72 to produce a sum, which is driven to one of GPR rename buffers 33 by driver 90.

Figure 4:
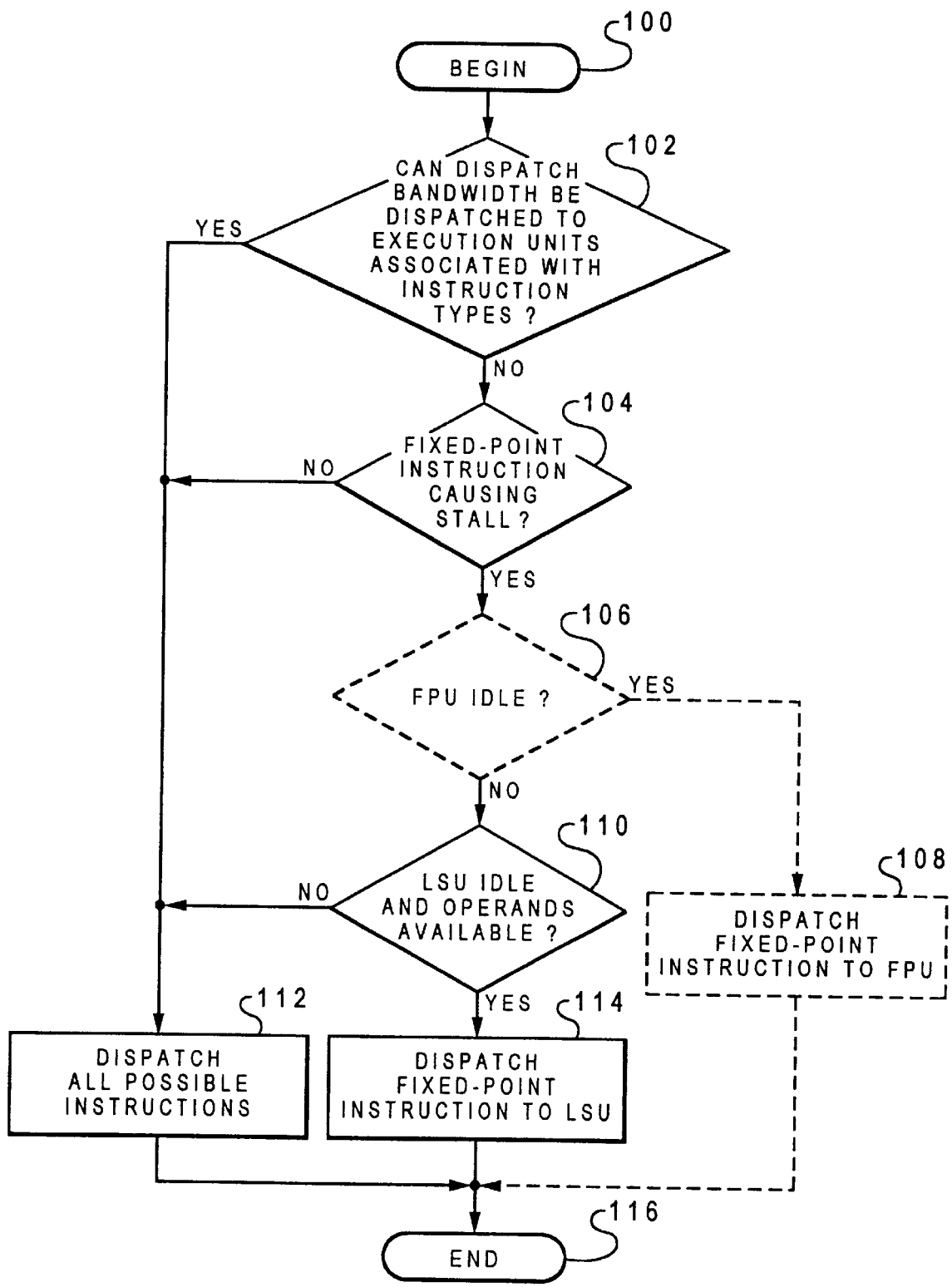
FIG. 4 is a flowchart depicting a preferred embodiment of the method for executing fixed-point instructions according to the present invention.
Figure 5:
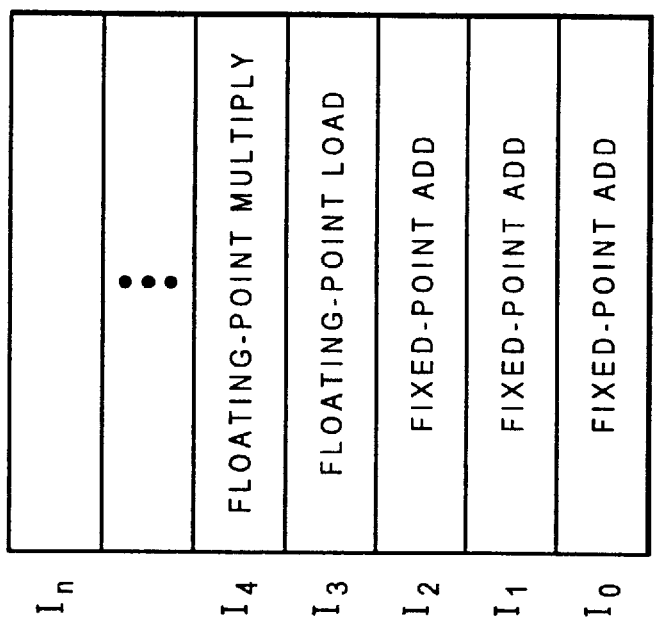
FIG. 5 illustrates an exemplary sequence of instructions within the instruction queue of the processor depicted in FIG. 1.

Referring now to FIG. 4, there is depicted a flowchart of a preferred embodiment of the method of executing fixed-point instructions according to the present invention. As illustrated, the process begins at block 100 and thereafter proceeds to block 102, which illustrates determining whether dispatch unit 20 can dispatch a full dispatch bandwidth of instructions during the current processor cycle to the execution units associated with the instruction types (i.e., fixed-point instructions to FXU 22, floating-point instructions to FPU 30, etc.). If so, the process proceeds to block 112, which depicts dispatch unit 20 dispatching a full dispatch bandwidth of instructions. However, if a full dispatch bandwidth of dispatch unit 20 cannot be dispatched to the execution units associated with the instructions, the process proceeds to block 104. For example, assume that instruction queue 19 stores the instructions illustrated in FIG. 5 and dispatch unit 20 has a dispatch bandwidth of two instructions. If the operands for instructions $I_0$ and $I_2$ are available and the operands for instruction $I_1$ are not available, a determination is made at block 102 that only instruction $I_0$ can be dispatched during the next processor cycle to the execution unit associated with its instructions type since FXU 22 can be issued at most one instruction per cycle.

Block 104 depicts determining whether a fixed-point instruction is causing a dispatcher stall. If not, the process proceeds to block 112, which illustrates dispatching all the instructions capable of being dispatched during the current cycle. Since in the example depicted in FIG. 5, instruction $I_2$ is a fixed-point instruction, the process proceeds to block 106, which illustrates determining whether FPU 30 is idle, that is, whether FPU 30 is asserting FPU idle signal 92 to indicate that FPU 30 is neither decoding, executing, or finishing an instruction. As indicated by dashed-line illustration, the determination illustrated a block 106 is made only in embodiments of the present invention in which FPU 30 is capable of executing fixed-point instructions. If a determination is made at block 106 that FPU 30 is idle, the process proceeds to block 108, which depicts dispatch unit 20 dispatching instruction $I_2$ to FPU 30 for execution. Thereafter, the process terminates at block 116.

Returning to block 106, if a determination is made that FPU 30 is not idle, the process proceeds to block 110, which illustrates determining whether LSU 28 is idle and whether all operands required to perform instruction $I_2$ are available. If either of the conditions depicted in block 110 are not met, the process proceeds to block 112, which illustrates dispatching only instruction $I_0$ for execution. Thereafter, the process terminates at block 116. However, if LSU 28 is idle and all required operands of instruction $I_2$ are available, the process proceeds to block 114, which illustrates dispatching instruction $I_2$ to LSU 28 for execution. The process then terminates at block 116.

As will be appreciated by those skilled in the art, the state machine represented by the flowchart illustrated in FIG. 4 will differ depending upon the precise implementation of execution units 22, 28, and 30 within processor 10. For example, in other embodiments of the present invention in which each of execution units 22, 28, and 30 includes a reservation station that stores instructions which have been dispatched to the execution units, but have not been executed, blocks 106 and 110 of the process are modified to determine whether the reservation stations within LSU 28 and FPU 30 have fewer instructions entries than the reservation station of FXU 22 (i.e., whether LSU 28 and FPU 30 are relatively less busy than FXU 22). In any case, the decision whether to dispatch a fixed-point instruction to LSU 28 and FPU 30 is based upon a determination of whether dispatching the fixed-point instruction to the non-FXU execution unit would enhance the execution efficiency of processor 10.

As has been described, the present invention provides an improved method and system for executing fixed-point instructions within a superscalar processor. In particular, the present invention provides a method of dynamically providing a fixed-point execution resource when the fixed-point execution unit is busy, thereby increasing execution unit utilization and minimizing dispatcher stalls. While the invention has been particularly shown and described with reference to a preferred embodiment, it will be understood by those skilled in the art that various changes in form and detail may be made therein without departing from the spirit and scope of the invention.

What is claimed is:

1. A method for executing fixed point instructions within a superscalar processor, said superscalar processor having a memory and a plurality of execution units, including a fixed point execution unit and a non-fixed point execution unit, wherein said superscalar processor can dispatch at most n instructions during each processor cycle, said method comprising:

storing a plurality of instructions within said memory;

fetching a set of instructions to be executed from among said plurality of instructions stored within said memory;

determining if n instructions among said set of instructions can be dispatched to said plurality of execution units during a first processor cycle if fixed point arithmetic and logical instructions are dispatched only to said fixed point execution unit;

in response to a determination that n instructions among said set of instructions can be dispatched during said first processor cycle, dispatching said n instructions to said plurality of execution units for execution;

in response to a determination that n instructions among said set of instructions cannot be dispatched during said first processor cycle, determining if a fixed point instruction among said set of instructions is available to be dispatched and whether or not dispatching said fixed point instruction to said non-fixed point execution unit for execution will result in greater efficiency; and in response to a determination that a fixed point instruction is not available to be dispatched or that dispatching said fixed point instruction to said non-fixed point execution unit will not result in greater efficiency, waiting to dispatch said fixed point instruction until a second processor cycle; and in response to a determination that dispatching said fixed point instruction to said non-fixed point execution unit will result in greater efficiency, dispatching said fixed point instruction to said non-fixed point execution unit during said first processor cycle and executing said fixed point instruction within said non-fixed point execution unit, wherein execution unit utilization is improved.

2. The method for executing fixed point instructions within a superscalar processor of claim 1, said superscalar processor having a plurality of registers associated therewith for temporarily storing result data of fixed point instructions, said method further comprising storing result data of said fixed point instruction within one of said plurality of registers.

3. The method for executing fixed point instructions within a superscalar processor of claim 1, wherein said step of dispatching said fixed point instruction to said non-fixed point execution unit is performed only if all required operands of said fixed point instruction are available.

4. The method for executing fixed point instructions within a superscalar processor of claim 1, wherein said step of determining whether dispatching said fixed point instruction to said non-fixed point execution unit for execution will result in greater efficiency comprises determining whether said non-fixed point execution unit would otherwise be idle during said first processor cycle.

5. The method for executing fixed point instructions within a superscalar processor of claim 1, said fixed point execution unit and said non-fixed point execution unit each having a reservation data structure which stores instructions that have been dispatched to that execution unit but have not been executed, wherein said step of determining whether dispatching said fixed point instruction to said non-fixed point execution unit for execution will result in greater efficiency comprises determining whether said reservation data structure of said fixed point execution unit stores a greater number of unexecuted instructions than said reservation data structure of said non-fixed point execution unit.

6. A superscalar processor, wherein said superscalar processor can dispatch at most n instructions during each processor cycle, said superscalar processor comprising:

a fixed point execution unit;

a non-fixed point execution unit, said non-fixed point execution unit including means for executing a fixed point instruction;

a memory;

means for storing a plurality of instructions within said memory;

means for fetching a set of instructions to be executed from among said plurality of instructions stored within said memory;

means for determining if n instructions among said set of instructions can be dispatched to said plurality of execution units during a first processor cycle if fixed point arithmetic and logical instructions are dispatched only to said fixed point execution unit;

means, responsive to a determination that n instructions among said set of instructions can be dispatched during said first processor cycle, for dispatching said n instructions to said plurality of execution units for execution;

means, responsive to a determination that n instructions among said set of instructions cannot be dispatched during said first processor cycle, for determining if a fixed point instruction among said set of instructions is available to be dispatched and whether or not dispatching said fixed point instruction to said non-fixed point execution unit for execution will result in greater efficiency;

means, responsive to a determination that a fixed point instruction is not available to be dispatched or that dispatching said fixed point instruction to said non-fixed point execution unit will not result in greater efficiency, for waiting to dispatch said fixed point instruction until a second processor cycle; and means, responsive to a determination that dispatching said fixed point instruction to said non-fixed point execution unit will result in greater efficiency, for dispatching said fixed point instruction to said non-fixed point execution unit during said first processor cycle and executing said fixed point instruction within said non-fixed point execution unit, wherein execution unit utilization is improved.

7. The superscalar processor of claim 6, said superscalar processor having a plurality of registers associated therewith for temporarily storing result data of fixed point instructions, said superscalar processor further comprising means for storing result data of said fixed point instruction within one of said plurality of registers.

8. The superscalar processor of claim 6, wherein said means for dispatching said fixed point instruction to said non-fixed point execution unit is operative only if all required operands of said fixed point instruction are available.

9. The superscalar processor of claim 6, wherein said means for determining whether dispatching said fixed point instruction to said non-fixed point execution unit for execution will result in greater efficiency comprises means for determining whether said non-fixed point execution unit would otherwise be idle during said first processor cycle.

10. The superscalar processor of claim 6, said fixed point execution unit and said non-fixed point execution unit each having a reservation data structure which stores instructions that have been dispatched to that execution unit but have not been executed, wherein said means for determining whether dispatching said fixed point instruction to said non-fixed point execution unit for execution will result in greater efficiency comprises means for determining whether said reservation data structure of said fixed point execution unit stores a greater number of unexecuted instructions than said reservation data structure of said non-fixed point execution unit.

11. The superscalar processor of claim 6, wherein said non-fixed point execution unit comprises a load-store execution unit.

12. The superscalar processor of claim 11, wherein said fixed point instruction is a fixed point addition of two operands, wherein said means for executing said instruction also comprises means for calculating an effective address within said memory.

13. The superscalar processor of claim 6, wherein said non-fixed point execution unit comprises a floating-point execution unit.

* * * * *